C. L. EASTHAM.
Gang-Plow.
No. 65,798.
Patented June 18, 1867.
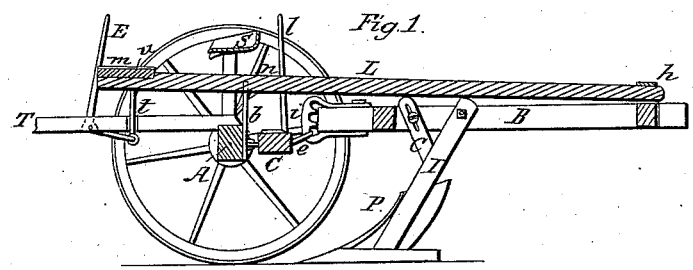
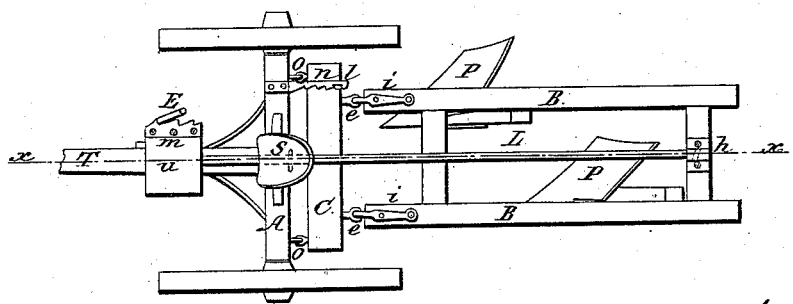
Witnesses.
P. T. Dodge.
J. A. Kissell.
Inventor.
C. L. Eastham.
by Dodge & Munn,
his Attys.

United States Patent Office.

C. L. EASTHAM, OF RHODES POINT, ILLINOIS.

Letters Patent No. 65,798, dated June 18, 1867.

---

GANG-PLOUGH.

---

The Schedule referred to in these Letters Patent and making part of the same.

---

TO ALL WHOM IT MAY CONCERN:

Be it known that I, C. L. EASTHAM, of Rhodes Point, in the county of McDonough, and State of Illinois, have invented certain new and useful improvements in Gang-Ploughs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of constructing gang-ploughs, by which they can be more easily and perfectly controlled by the ploughman, as hereinafter explained.

Figure 1 is a longitudinal vertical section taken on the line $x$ $x$ of fig. 2.

Figure 2 is a top plan view of the plough complete and ready for use.

I provide an axle, A, and mount it on two wheels, and attach a tongue, T, rigidly thereto, in any suitable manner. To the rear side of the axle I hinge a transverse bar, C, by means of eye-bolts $o$, and to this bar I attach rigidly a lever, $l$, which projects vertically upward, so as to be within reach of the driver when mounted on the seat S, there being a curved ratchet-bar, $h$, bolted to the axle, and projecting upward and backward, and having a series of notches formed in its edge to receive and hold the lever $l$ where desired. To the rear side of the bar C are attached two staples $s$, as shown in fig. 2, to which the front end of the plough-beams B are connected by means of clevis $i$, as represented more clearly in fig. 1. Two plough-beams are used, each having a plough, P, attached, as represented in the drawings, the beams being rigidly connected by cross-bars, as shown. The standard I of the ploughs is pivoted to the beam, and held in place by a brace, $c$, having a slot or series of holes, by which the pitch of the ploughs may be adjusted as desired. A lever, L, having its rear end pivoted to the rear portion of the plough-beams, extends forward of the axle and rests on a support, $b$, under the seat, its front end being provided with a foot-board, $u$. An elbow-lever, E, is pivoted to the side of the tongue, as represented in fig. 1, and its horizontal arm is connected by a link, $t$, to the front end of lever L, there being a notched plate, $m$, secured to the edge of the foot-board $u$, for holding the lever E in any desired position.

By drawing this lever E backward the front end of lever L is depressed, and this acting on the fulcrum $b$ elevates the rear end of the plough-beams, and thus keeps the ploughs clear of the ground. By means of the lever $l$ the bar C may be tilted up or down, and thus raise or lower the plough-points at pleasure, and by means of the clevis $i$ they may be set to run deep or shallow, as desired, thus giving the operator perfect control of them.

Having thus described my invention, what I claim is—

1. The combination of the axle A and hinged bar C, provided with the lever $l$, and having the ploughs attached thereto as described, all constructed and arranged to operate substantially as set forth.

2. The combination of the lever L connected to the plough-beams, and having a fulcrum at or near the axle, with the elbow-lever E pivoted to the tongues, or equivalent part, arranged to operate as described.

C. L. EASTHAM.

Witnesses:
    ED. A. DODGE,
    EDWARD F. COREY.